United States Patent [19]

Anderson et al.

[11] Patent Number: 5,321,637
[45] Date of Patent: Jun. 14, 1994

[54] METHOD FOR MEASURING THE WEIGHT OF A SUSPENDED LOAD

[75] Inventors: Robert N. Anderson, Galion; Don C. Splitstone, Marion; Mark R. Bentley, Lexington, all of Ohio

[73] Assignee: Indresco, Inc., Dallas, Tex.

[21] Appl. No.: 96,055

[22] Filed: Jul. 22, 1993

Related U.S. Application Data

[63] Continuation of Ser. No. 639,928, Jan. 10, 1991, abandoned.

[51] Int. Cl.$^5$ ...................... G06F 15/46; G01G 19/14
[52] U.S. Cl. .................................... 364/567; 364/483; 364/424.07; 177/147
[58] Field of Search .............. 364/567, 551.01, 551.02, 364/483, 424.04, 424.07; 177/139, 147; 414/21

[56] References Cited

U.S. PATENT DOCUMENTS

| | | | |
|---|---|---|---|
| 3,826,321 | 7/1974 | Rigney et al. | 177/210 R |
| 4,035,621 | 7/1977 | Kemp | 364/424.04 |
| 4,153,123 | 5/1979 | Bereyziat | 177/147 |
| 4,228,681 | 10/1980 | Pruex | 364/567 |
| 4,368,521 | 1/1983 | Sholes, III | 364/424.07 |
| 4,370,713 | 1/1983 | McCoy, Jr. et al. | 364/424.07 |
| 4,413,691 | 11/1983 | Wetzel | 177/147 |
| 4,509,376 | 4/1985 | Thomasson | 73/862.56 |
| 4,532,595 | 7/1985 | Wilhelm | 364/463 |
| 4,627,013 | 12/1986 | Ichiyama et al. | 364/567 |
| 4,677,579 | 6/1987 | Radomilovich | 364/567 |
| 4,809,794 | 3/1989 | Blair et al. | 177/139 |
| 4,833,615 | 5/1989 | Bitner et al. | 364/424.07 |

OTHER PUBLICATIONS

"Drive System Instructions: DIGMATE TM Plus On-Board Excavator Monitor and Production Reporting System and BOOMSENTRY TM Plus Anti-Tightline Control", document GEH-5367 (General Electric, Jun. 1986).

Primary Examiner—Thomas G. Black
Assistant Examiner—Michael Zanelli
Attorney, Agent, or Firm—Vinson & Elkins

[57] ABSTRACT

A method for measuring the weight of a suspended load, such as the bucket of a dragline, is disclosed. The method incorporates visual observations by a person such as a test engineer, or the operator of the dragline. During a dig cycle, once the steady state operation of the hoist is achieved, sampling of parameters such as hoist motor armature and field currents, and hoist and drag rope lengths, is performed. Using the calculated values of the force applied to the load and the geometry determined by the various rope lengths, the weight of the suspended load is calculated for each sample in the dig cycle. The calculated weight data may be accepted or rejected based upon the presence of dynamic factors observed by the test engineer or operator, or evident in the data. Calibration of certain values, such as the hoist efficiency, may take place on-site, rather than relying on theoretical or modeled values. If multiple hoist motors are used, data is sensed at each, and the hoist pull force applied by each individually calculated, for improved accuracy.

19 Claims, 4 Drawing Sheets

METHOD FOR MEASURING THE WEIGHT OF A SUSPENDED LOAD

RELATED APPLICATIONS

This is a continuation of application Ser. No. 07/639,928, filed on Jan. 10, 1991, now abandoned, and entitled A METHOD FOR MEASURING THE WEIGHT OF A SUSPENDED LOAD.

This invention is in the field of mining, and is more particularly directed to real-time control of mining operations.

BACKGROUND OF THE INVENTION

A dragline is a type of excavation equipment commonly used in the mining industry. Dragline equipment conventionally includes a bucket for entering the surface of the earth, and for carrying the removed material to the desired location. In a conventional dragline, a hoist rope suspends the bucket from the tip of a boom, and a drag rope, connected near the foot of the boom, operates to drag the bucket horizontally along the ground and, via dump linkage including a pulley, controls the angle of the bucket to control the digging, carrying and dumping operations. In modern dragline equipment, the capacity of the bucket can range from on the order of 10 cubic yards to on the order of 150 cubic yards, with the total weight of a large, fully loaded, bucket capable of exceeding 100 tons. The dragline itself is generally rated for a specific allowable load that it can lift without exceeding its design limit. This rated weight includes the total weight of all components under the boom, including wire rope, chains, and the empty bucket. The actual weight of the material being removed depends, of course, on the density of the removed material, and also the volume removed (which, in turn, depends upon the digging technique, and the angle between the surface of the material and that of the bucket during digging).

In a mining operation using such a dragline, highest efficiency is of course achieved by moving the most earth material in the shortest period of time. Particularly for jobs at which the dragline is operating twenty-four hours a day, dragline downtime is particularly costly. It has been observed that an important factor in the efficiency of a dragline operation is the matching of the bucket design capacity to the job being done. If the bucket is too large for the density of the earth being excavated (or, in other words, has too large a volume capacity relative to the dragline allowable load), failure of the dragline can occur, causing downtime and increasing the cost of the job. Conversely, if the bucket is undersized, in volume capacity, for the density of the removed material, productivity is lost since the full capability of the dragline is not being utilized.

In recent years, dragline buckets of light-weight design have been used in order to increase the amount of material excavated for a dragline of a given allowable load. This incremental decrease in strength provided by such light-weight bucket designs reduces the margin for error in loading the bucket relative to its design limit.

There are many other factors which determine the capacity of a dragline bucket in removing portions of the earth. For example, different bucket manufacturers may use different construction techniques in designing and manufacturing dragline buckets, resulting in different empty weights for the buckets. Furthermore, field modifications to buckets are often made to change the stiffness or durability of the dragline bucket, or to make necessary repairs. Furthermore, different draglines may use different weight chains and lines, which affect the total suspended weight of the dragline rigging and, in turn, the amount of material which may be removed in a single bucketload. In addition, different portions of the surface under excavation may consist of multiple formations of differing densities, such that the bucket weight varies from one dig operation to the next. The angle of repose of the material being dug, and the operator's technique for filling the bucket, also causes the bucket weight to vary from dig to dig, as the material being removed can easily heap in the bucket, and thus exceed the rated capacity of the bucket.

As a result, it is difficult to model or otherwise estimate the full weight of a dragline bucket prior to an excavation operation in such a manner to determine that the bucket is properly sized for the allowable load capacity of the dragline, much less with confidence that it will remain properly sized during the excavation process. Accordingly, it is useful to monitor the actual bucket and rigging weight during the excavation process so that the operator can take real-time corrective action such as modifying the digging parameters, or changing buckets, so as to improve the excavation efficiency. For example, the operator may use different sized buckets for different areas of the mining pit being excavated.

Prior techniques have been used to monitor dragline bucket weights. For example, mechanical and electronic scales have been used to directly measure the weight of the full bucket load. However, cessation of the digging operation to weigh bucket loads adds overhead time to the overall excavation to such a degree that such weighing of the bucket would be done, at best, for sample loads, rather than for all loads. In addition, dragline buckets are quite large, with dimensions that vary widely from bucket to bucket, making it quite impractical to move a fully loaded bucket to a conventional scale. Attempts to use portable scales to weigh loaded dragline buckets have met with limited success.

Another prior technique involves the recordation of operating parameters, by way of a strip chart recorder or the like, coded into machine-readable form for analysis by an off-site computer, for example using a running average technique. Such a technique, however, fails to provide real-time on-site process control information, as the analysis is performed after the excavation. In addition, this method discounts abnormal conditions encountered by the dragline, as would occur during normal operation of a dragline.

Furthermore, it should be noted that post-excavation analysis of the data is done without the benefit of on-site visual information. It should be noted that such events as loss of material from the bucket during the raising of the bucket, bouncing of the bucket after being raised, and the like, each of which cause the calculated bucket weight data to be in error, will not necessarily be apparent from the recorded data. As such, invalid data which ought to be discarded or discounted is used in the calculation of the bucket weight in such post-excavation analysis.

Furthermore, it should be noted that this prior method has utilized hoist armature current from one motor, even for draglines where more than one hoist motor is included. Even with optimized balancing of multiple hoist motors in a dragline, it has been observed that the actual pulling force of the hoist motors will not be equally distributed among the multiple hoist motors. Accordingly, calculation of the bucket weight using the armature current from only one of the motors will introduce error into the calculation.

Other prior techniques have been used to monitor and report various excavation parameters. A first of these prior techniques is the DIGMATE® Plus On-Board Excavator Monitor and Production System (including the BOOMSENTRY® Plus Anti-Tightline Control), manufactured and sold by General Electric. In this permanently installed system, the dragline power, hoist rope force, drag rope force, hoist motor field strength, hoist rope position, drag rope position, and swing angle parameters are continuously measured and monitored, with thirty-two dragline parameters calculated therefrom, including bucket fill out to dump and bucket fill return to dig, both measured in tons.

As in the off-line analysis case, data collected continuously will necessarily provide a substantial quantity of data which ought to be discarded from a determination of bucket weight, such as resulting from cycles with loss of material, bouncing, or other bucket transient conditions. To avoid this problem, it is believed that permanently installed monitoring systems generally include an algorithm based on generalized assumptions about the dig cycle operation, which determines the time and duration of data collection during each the dig cycle. However, generalization of the dig cycles will necessarily be invalid for certain operations (for example, where the duration of data collection is longer than the time at which the load is suspended), and also limits the system's ability to take advantage of those operations for which larger amounts of data may be taken. Accordingly, it is believed that the accuracy of the bucket weight measurements from permanently installed systems is limited.

Another prior system is described in U.S. Pat. No. 4,677,579, issued to D. Radomilovich on Jun. 20, 1987. The disclosed system is particularly adapted to a shovel loader (although, as noted in column 1, lines 6 through 10, and in column 2, lines 9 through 14, this system is disclosed as applicable to a dragline). Parameters relative to the operation of the hoist motor, such as armature voltage, field current, and RPM are measured and, together with parameters concerning the geometry of the system, are used to analytically compute the total weight of the bucket using the dynamic calculation of dividing a force by an acceleration; the reference also indicates that calculation of the bucket weight using the total vertical force as an apparent weight is known (see column 7, lines 15 through 24). However, this method is of course quite complicated by the inclusion of the necessary data and calculations to analytically determine the load weight, taking into account acceleration, deceleration, and other transient effects. Furthermore, it is believed that the bucket weight of a dragline can be more accurately calculated in substantially a steady-state condition, relative to the more dynamic condition disclosed in this reference.

It is therefore an object of this invention to provide a system and method of providing real-time measurement of a suspended weight, such as a dragline bucket weight.

It is a further object of this invention to provide such a system and method which can be performed without cessation of the digging operation.

It is a further object of this invention to provide such a system and method which utilizes visual information during the operation so that transients and dynamic effects are minimized.

It is a further object of this invention to provide such a system and method which utilizes visual information so that improper data is not taken or utilized in the calculation of the suspended weight.

It is a further object of this invention to provide such a method and system which provides correction for parasitic effects, such as friction, of the hoist motor, gear train, and rope sheaves, based on actual field data rather than on modeled or theoretical estimates.

It is a further object of this invention to provide such a method and system which uses both hoist field and hoist armature currents, from each of several hoist motors, to determine the suspended weight.

It is a further object of this invention to provide such a method and system which provides summary output listing the bucket weights of a number of dig cycles measured during the excavation.

Other objects and advantages of the present invention will be apparent to those of ordinary skill in the art having reference to this specification, together with the drawings.

SUMMARY OF THE INVENTION

The invention may be incorporated into a computer system used in conjunction with excavation equipment, and at the excavation site, to calculate the weight of a suspended load, such as the weight of a full dragline bucket. Sensors are provided for sensing and communicating the parameters of hoist rope length, drag rope length, hoist motor field and armature currents, and hoist motor speed, to the computer system. The sensors are enabled at a point during the operation at which transients such as acceleration of the hoist motor are not present, so that the bucket is in substantially a steady-state condition when the sensed information is retrieved and stored. The sensed parameters provide the basis for calculating, in real-time, the bucket weight, so that the operator of the dragline can ensure that the dragline is operating at its highest efficiency and productivity, without risking failure due to bucket overload. Control and alarm limits may also be provided for each of the measured and calculated parameters, so that the operator is made aware of abnormal occurrences.

The system may also include calibration of the sensed information based on actual measurements in the field, rather than on theoretical or modeled estimates. The use of these calibration results further improves the accuracy of the measured and calculated suspended weight.

DETAILED DESCRIPTION OF THE PREFERRED EMBODIMENT

Figure 1:
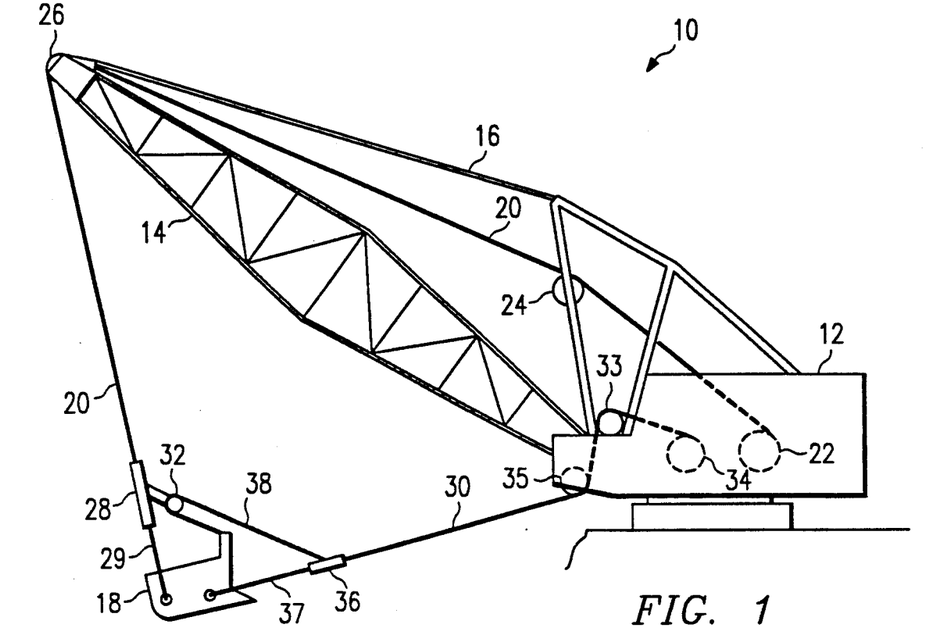
FIG. 1 is a schematic diagram of a dragline into which the preferred embodiment of the invention is incorporated.

Referring to FIG. 1, a conventional dragline 10 into which the preferred embodiment of the invention may be incorporated is illustrated schematically. An example of a conventional dragline 10 is a Model 8200 manufactured and sold by Dresser Industries, Inc., Marion Division. Dragline 10 includes a machinery house 12, which is movable by tracks, wheels, or an electrically powered walking mechanism common to most large draglines. Extending from machinery house 12 is boom 14, which extends toward the location of excavation. Support 16 also extends from machinery house 12, and provides vertical support to boom 14.

Bucket 18 is suspended from the end of boom 14 by way of hoist rope 20. It should be noted that hoist rope 20 conventionally is a heavy metal cable, but is referred to as a rope in the art. Hoist rope 20 is attached to hoist drum 22 in machinery house 12, which is powered by one or more conventional electric hoist motors (not shown in FIG. 1), such as a Model 824 manufactured by General Electric Corporation. For example, in the Dresser Industries Model 8200 dragline, six of such hoist motors are used. Hoist rope 20 extends from hoist drum 22, is supported by sheave 24 on support 16, and suspends from sheave 26 at the tip of boom 14. The terminal end of hoist rope 20 is connected to conventional tackle 28 which connects to dump sheave 32, and to hoist chain 29. Hoist chain 29 connects to bucket 18 on both the left and right hand sides of bucket 18, either on the inside or the outside thereof, in the conventional manner.

Also located in machinery house 12 is drag drum 34, which also includes one or more electric motors (not shown in FIG. 1) for winding and releasing drag rope 30. Drag rope 30 extends from drag drum 34 in machinery house 12, via upper fairlead sheave 33 and lower fairlead sheave 35, to drag tackle 36. Drag tackle 36 connects to chain 37 on one end; chain 37 in turn is connected to the leading end of bucket 18 in the conventional manner. Dump linkage 38 also extends from drag tackle 36, and is a cable of fixed length which travels around dump sheave 32, and connects to the top of bucket 18 in the conventional manner.

Accordingly, the angle of the leading end of bucket 18 (which is on the side of bucket 18 facing machinery house 12, as is conventional for draglines) is controlled by the relative lengths of drag rope 30 and hoist rope 20 extending from machinery house 12. For example, for a given length of hoist rope 20, as drag rope 30 is released to extend further from machinery house 12, the portion of dump linkage 38 between dump tackle 36 and dump sheave 32 will shorten and the portion of dump linkage 38 between dump sheave 32 and bucket 18 will lengthen, causing bucket 18 to dump its contents. Conversely, as drag rope 30 is retracted into machinery house 12 by drum 34, the portion of dump linkage 38 between tackle 36 and dump sheave 32 will lengthen, pulling bucket 18 toward machinery house 12 in an upwardly tilted position so that, if bucket 18 is in contact with the earth, it will dig into the earth and retain the removed material.

Figure 2:
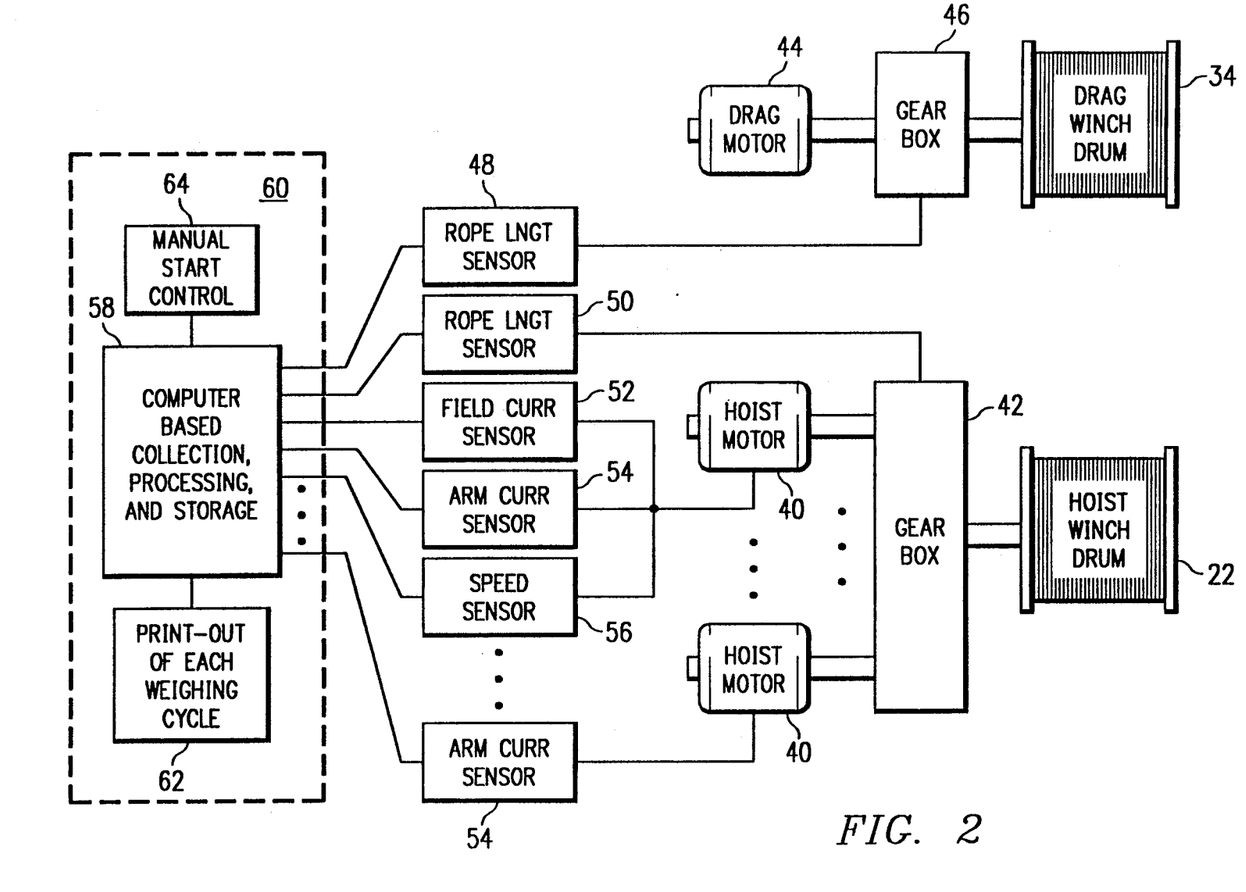
FIG. 2 is a block diagram of the sensor and computer system according to the preferred embodiment of the invention.

Referring now to FIG. 2, the monitoring and computing system according to this embodiment of the invention will now be described in detail. Hoist winch drum 22, as noted hereinabove in FIG. 1, winds and releases hoist rope 20. Hoist drum 22 is powered by multiple conventional hoist motors 40, each of which, as noted hereinabove, is an electric motor such as the General Electric Model 824. The rotors of hoist motors 40 are coupled to hoist drum 22 by a conventional gear box 42; generally, in a multiple hoist motor system, each of the hoist motors 40 will couple into individual initial gears, each of which are eventually coupled into the final gear of gear box 42 to drive hoist drum 22.

Similarly, drag winch drum 34 winds and releases drag rope 30, as noted hereinabove relative to FIG. 1. Drag drum 34 is powered by one or more drag motors 44, which is a conventional motor similar to hoist motor 40 described hereinabove. The rotor of drag motor 44 is coupled to drag drum 34 via a conventional gear box 46, in the same manner as for the hoist system.

According to this preferred embodiment of the invention, a number of sensors are provided for sensing various parameters from motors 40, and gear boxes 42 and 46, and for generating an electrical signal corresponding thereto. Drag rope length sensor 48 is connected into drag gear box 46 (or alternatively to drag motors 44, or directly to drag drum 34) for sensing the turns of drag drum 34 and, accordingly, for sensing the length of drag rope 30 extending from drag drum 34; similarly, hoist rope length sensor 50 is connected into hoist gear box 42 (or alternatively to the hoist motors 40, or directly to hoist drum 22) for sensing the turns of hoist drum 22 and, in turn, sensing the length of hoist rope 20 extending from hoist drum 22. Examples of rope length sensors 48 and 50 include conventional linear potentiometers driven through appropriate gear reductions and conventional optical sensors.

Field current sensor 52 and each of the armature current sensors 54 are connected in series with a hoist motor 40, to measure the field and armature currents, respectively. Current sensors 52 and 54 preferably are of the conventional resistive current shunt type, configured to provide an electrical output corresponding to the current sensed thereby. Speed sensor 56 is preferably of the DC tachometer type, for sensing the rotations of a hoist motor 40 per unit time. According to this embodiment of the invention, the sensed armature current information will be utilized from each hoist motor 40; it should be noted that, in this embodiment of the invention, the field current and speed information from one of hoist motors 40 will be representative of the others of hoist motors 40.

Each of sensors 48, 50, 52, 54, 56 have their outputs coupled to computer system 60 for analysis and output. Computer system 60 includes computer 58, such as a microprocessor-based workstation, for example a Model T3200 manufactured and sold by Toshiba. Computer 58 preferably includes an interface board and software for receiving analog signals from sensors 48, 50, 52, 54, 56 and storing the same in a data base in computer 58 for later analysis. An example of the preferred interface board and software for a microprocessor-based workstation is the Measure ™ program, in combination with a sixteen channel analog-to-digital interface, manufactured and sold by National Instruments. For analysis of the data acquired from sensors 48, 50, 52, 54, 56, computer 58 may be programmed with a conventional database analysis program, such as 1-2-3 ® manufactured and sold by Lotus, including the computations to be described hereinbelow for calculation of the weight of bucket 18 from the sensed information. Computer system 60 further includes printer 62, or other suitable output devices, for displaying the results of the method to be described hereinbelow, and also manual start control device 64, or other suitable input device such as the computer keyboard or a remote triggering device, to allow operator control of computer system 60.

Figure 3:
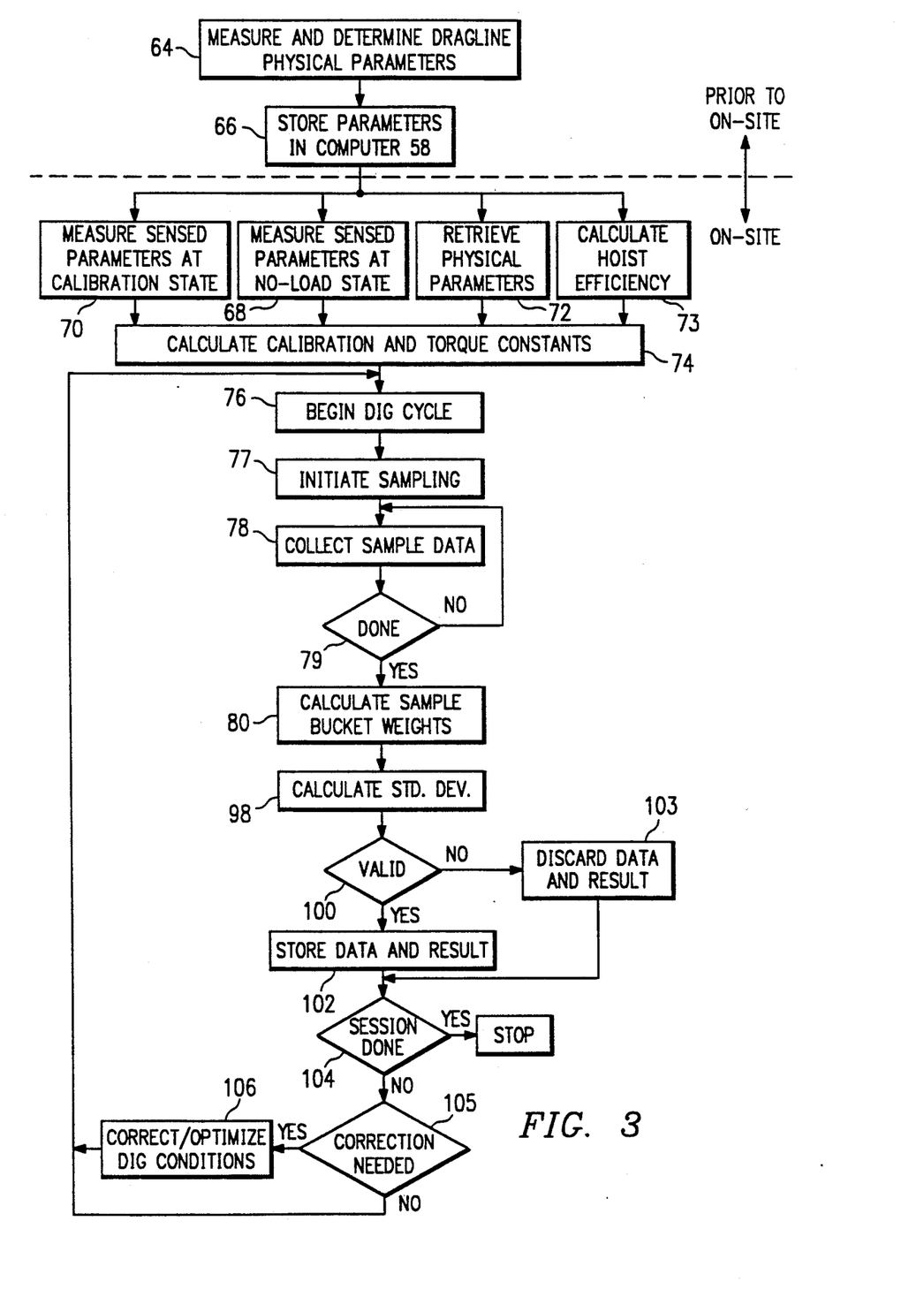
FIG. 3 is a flow diagram of the operation of the system according to the preferred embodiment of the invention.
Figure 5:
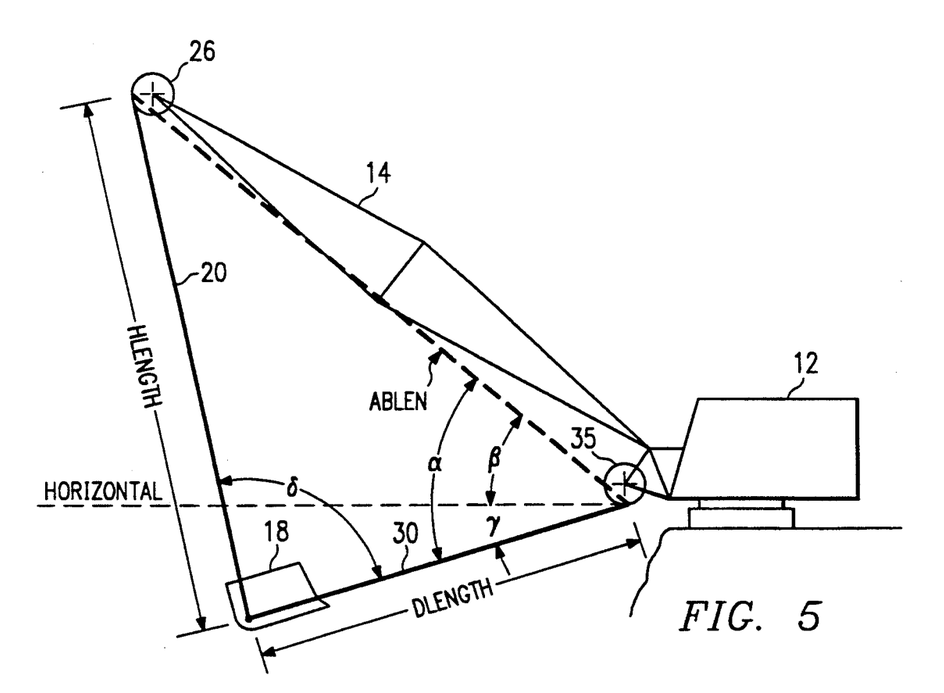
FIG. 5 is a schematic diagram of the geometries of the dragline of FIG. 1 as used in the method of FIG. 4.

Referring now to FIG. 3, an example of a method of operating the system, according to the preferred embodiment of the invention, to determine the weight of bucket 18 in dragline 10 will be described in detail. According to this embodiment of the invention, certain physical parameters of dragline 10 may be determined prior to installation on dragline 10 at the excavation site. A first group of these physical parameters are used to define the geometry of dragline 10. Referring to FIG. 5, and as will be discussed in further detail hereinbelow, a triangle may be defined which has drag rope 30 as one side, the length of hoist rope 20 between sheave 26 and bucket 18 as another side and, as the third side, a line segment ABLEN extending from the point of sheave 26 at which hoist rope 20 extends toward bucket 18 to the point of lower fairlead sheave 35 at which drag rope 30 extends toward bucket 18. The length of the distance ABLEN, and the angle $\beta$ defined by the line segment ABLEN relative to the horizontal, may be defined prior to installation on dragline 10 in the field.

Other parameters relative to dragline 10 may also be defined prior to installation. These include the number of hoist motors 40 in each current loop, the hoist motor drive ratio, the pitch diameter of hoist drum 22, and certain motor torque functions and values, including the field and armature current shunt ratings (CAS3 and CAS4, respectively, as will be used hereinbelow). These physical parameters may either be characterized for the particular dragline 10 or alternatively, the specification values may be used; in FIG. 3, the determination of these physical parameters is performed in process 64. The particular values which are determined in process 64 and used in the method hereinbelow include the following:

HDIA: hoist drum pitch diameter
HRATIO: hoist drive ratio (from gear box 46)
NMOTOR: the number of hoist motors in each current loop In process 66, the physical parameters determined in process 64 are stored in the memory of computer 58.

Calibration of the hoist and drag motor, gear and drum systems and sensors is preferably done for dragline 10 on-site according to this method. On-site calibration allows for the actual measurement of such parameters as hoist friction and motor efficiency in the actual excavation conditions, for the particular equipment used, and at the temperature, humidity, and other environmental conditions present in the field; in addition, the particular installation arrangement of the sensors is preferably accounted for in the calibration. As is conventional in the calibration of instrumentation and control systems, both a zero (or reference) factor and a linear calibration factor are preferably determined.

Accordingly, in process 68, dragline 10 is set at a no-load (or zeroed) state, and data is retrieved from sensors 48, 50, 52, 54, 56 to obtain the following no-load values:

CNL1: zero reading of hoist rope length
CAX1: add-on value to normalize hoist rope length
CNL2: zero reading of drag rope length
CAX2: add-on value to normalize drag rope length
CNL3: no load field current reading for a hoist motor 40
CNL4: no load armature current reading for each hoist motor 40
CNL5: no load RPM reading for a hoist motor 40

It has been observed that the RPM values for one of multiple hoist motors 40 will be sufficiently accurate for purposes of this embodiment of the invention, as the variation in these values for the multiple hoist motors 40 will not be significant for purposes of this method.

In process 70, calibration readings of sensor data are also taken at a calibration setting (i.e., a defined hoist motor load). For example, calibration is accomplished in this embodiment of the invention by way of substituting a calibration signal for the sensors, in the conventional manner, to simulate a known motor current. The calibration readings taken in process 70, by whatever method, are as follows:

CAL1: sensed reading of hoist rope length
CAZ1: actual hoist rope length at calibration
CAL2: sensed reading of drag rope length
CAZ2: actual drag rope length at calibration
CAL3: sensed reading of field current for a hoist motor 40
CAZ3: actual field current for a hoist motor 40 at calibration
CAL4: sensed reading of armature current for each hoist motor 40
CAZ4: actual armature current for each hoist motor 40 at calibration
CAL5: sensed RPM for a hoist motor 40
CRPM5: actual RPM for a hoist motor 40 at calibration Process 72 in the method of FIG. 3 retrieves the physical parameters stored by process 66 in computer 58. Based on the physical parameters retrieved in process 72, and also on the calibration data taken in processes 68 and 70, the following calibration constants are calculated in process 74, for the particular dragline 10 at the excavation site:

MUF1=CAZ1/(CAL1−CNL1): for hoist rope length
MUF2=CAZ2/(CAL2−CNL2): for drag rope length
MUF3=CAS3(CAZ3/100)/(CAL3−CNL3): for field current
MUF4=CAS4(CAZ4/100)/(CAL4−CNL4): for armature current
MUF5=CRPM5/(CAL5−CNL5): for hoist motor speed It should be noted that the calibration coefficient MUF4 is calculated for each of the multiple hoist motors 40 in dragline 10.

Also according to this method, process 73 is performed to gather the data necessary to calculate the efficiency coefficient EFF for dragline 10, cumulative for all hoist motors 40, in its on-site condition and environment. This coefficient is established for the entire hoist system, including hoist motors 40, hoist rope 20, and the hoist sheave and gearing system connecting hoist rope 20 to bucket 18 (i.e., sheaves 24 and 26). The efficiency coefficient EFF is determined by measuring the average armature currents for each of hoist motors 40 while raising bucket 18 (while empty) strictly in the vertical direction (i.e., with drag rope 30 slack), and also while vertically lowering empty bucket 18. By comparing the armature currents (assuming constant field current) in the raising and lowering operations, for each of hoist motors 40, the amount of current (or pulling force) required for lifting the load as a fraction of the total current or force, can be determined. That portion of the current which is dissipated, but which is not directly used in the lifting operation, is the amount of force required to overcome friction in the system. In this embodiment of the invention, the efficiency coefficient EFF is calculated as follows:

$$EFF = [I_{lowering}/I_{hoisting}]^{1/2}$$

where the current $I_{lowering}$ is the average armature current measured while lowering the empty bucket, and where the current $I_{hoisting}$ is the average armature current measured while raising the empty bucket. This efficiency coefficient EFF is utilized in process 74, along with the other calibration constants, and will be used as a multiplicative factor in determining the bucket weight from the armature currents. It should also be noted that process 74 also preferably adjusts all values to be in consistent engineering units.

It should be noted that the field measurement of the hoist system efficiency coefficient EFF provides for improved accuracy in the determination of the weight of the load suspended thereby. This is because the actual motor, gear and sheave friction is measured, rather than modeled or theoretically assumed, and is measured at the temperature, humidity, and other environmental conditions which will be present in the excavation operation. Such conditions would not otherwise be accurately taken into account.

Process 74 then determines the strong and weak field current torque functions (HTSTRG and HTWEAK, respectively) for each hoist motor 40, using values of the strong and weak field currents, measured for each hoist motor 40 at normal operating temperatures and conditions. Using these torque functions, and the efficiency coefficient EFF, the pull constants for each hoist motor 40 are calculated in process 74 as follows:

HPULLKS=HTSTRG*HRATIO*NMOTOR-
*EFF/(1000*(HDIA/24)) for strong field hoist motor operation HPULLKW=HTWEAK*HRATIO*NMOTOR-
*EFF/(1000*(HDIA/24)) for weak field hoist motor operation It should also be noted that, besides calculation of the above-noted calibration constants, other initial set-up conditions are determined in the field. For example, an excavation or test engineer in the field may instruct the dragline operator relative to the technique to be used in the excavation and hoisting operation, and may instruct relocation of dragline 10 to more stable or level footing at the excavation site. The engineer also may set or adjust the number of samples, and the sampling rate, for the sensing and transmission of data from sensors 48, 50, 52, 54, 56 to computer 60 during the excavation; it should be noted that the number of samples and the sampling rate may be optimized for particular excavation conditions.

Upon completion of the calibration, excavation, and sampling setup, the excavation may commence with a dig cycle, as indicated by process 76 in FIG. 3. After removal of material from the earth, visual observation of the dragline operation is performed by the engineer, operator, or other personnel at the excavation site. The visual operation provides information relative to the excavation, such as the presence of undesired conditions such as bouncing of bucket 18, loss of material from bucket 18, and the like. Once dragline 10 has removed material from the earth, hoist motors 40 accelerate the hoisting of bucket 18, in conjunction with drag motor 44 in the conventional manner so that bucket 18 is maintained at an angle which allows it to retain the removed material. After completion of the acceleration of bucket 18 in the vertical and horizontal directions by hoist motors 40 and drag motors 44, respectively, to suspend bucket 18 clear of the surface, and in a steady-state condition where hoist motors 40 and drag motors 44 are running at a relatively constant speed, the engineer (or operator or other personnel) provides a signal to the system, by way of a push-button or other type of control input 64, which initiates process 78, in which sensors 48, 50, 52, 54, 56 sense their respective parameters in a sampled manner, and communicate the same to computer system 60 for storage and processing.

Control of the initiation of the sampling of the sensed parameters responsive to visual observation allows for the benefits of confining the sensing of the digging parameters to a specific time in the dig cycle at which dynamic operation is minimized, thus providing for the calculation of the load weight in substantially a steady-state (i.e., in a non-accelerating and non-decelerating) condition, and also producing consistency from dig cycle to dig cycle. As noted hereinabove, non-stop automated collection of data according to prior methods has been observed to provide a substantial quantity of data which ought to be discarded from analysis, generally at an off-site computing or analysis facility. As a result, the method according to the preferred embodiment of the invention assures that only valid data is used in the bucket weight calculation. The method also provides for consistency of weight measurement from dig cycle to dig cycle, manually triggered by the engineer or dragline operator to correspond to a portion of the dig cycle at which the calculation will be valid.

Process 78 will be repeated until the desired number of samples of sensed data from sensors 48, 50, 52, 54, 56 are taken and communicated to computer system 60. After completion of each sample of the sensed parameters, process 79 determines whether the sampling period is complete, or if additional sampled data is desired. If additional samples are yet to be taken and calculated, the parameters are again sensed in process 78, until the sampling period expires. For example, the sampling rate may be on the order of twenty samples per second, and the duration of the samples may be on the order of two to five seconds, so that on the order of forty to one hundred values of the sensed parameters are sensed and stored. During this data acquisition, or sampling period in which the sample measurements are taken, the engineer preferably continues to visually observe dragline 10, to ensure that no discontinuities occur which would upset the measurement. For example, the engineer can observe whether or not material falls out of bucket 18 during the sampling period, and if so, can discard all data from the sample period to ensure that inaccurate bucket weights are not included in the computer data base.

Upon completion of the sampling period, and the storage of the sampled sensed parameters from process 78, computer system 60 calculates the weight of bucket 18 in process 80 for each sample, and provides output of the same as desired by the operator. For example, each of the sample calculated bucket weights may be displayed, along with the average bucket weight and the values (and statistics) of the other sensed parameters used in the calculation of the bucket weight. Accordingly, using the method of the preferred embodiment of the invention, the condition of dragline 10 may be visually correlated with the bucket weight measurement (and other monitored parameters) instantaneously calculated by computer system 60 in processes 80 and 98, as the engineer or operator has control over the point in time at which the sensing occurs. Such visual correlation allows for improved bucket weight accuracy, as the engineer or operator can visually diagnose problems which the calculated data points out.

Figure 4:
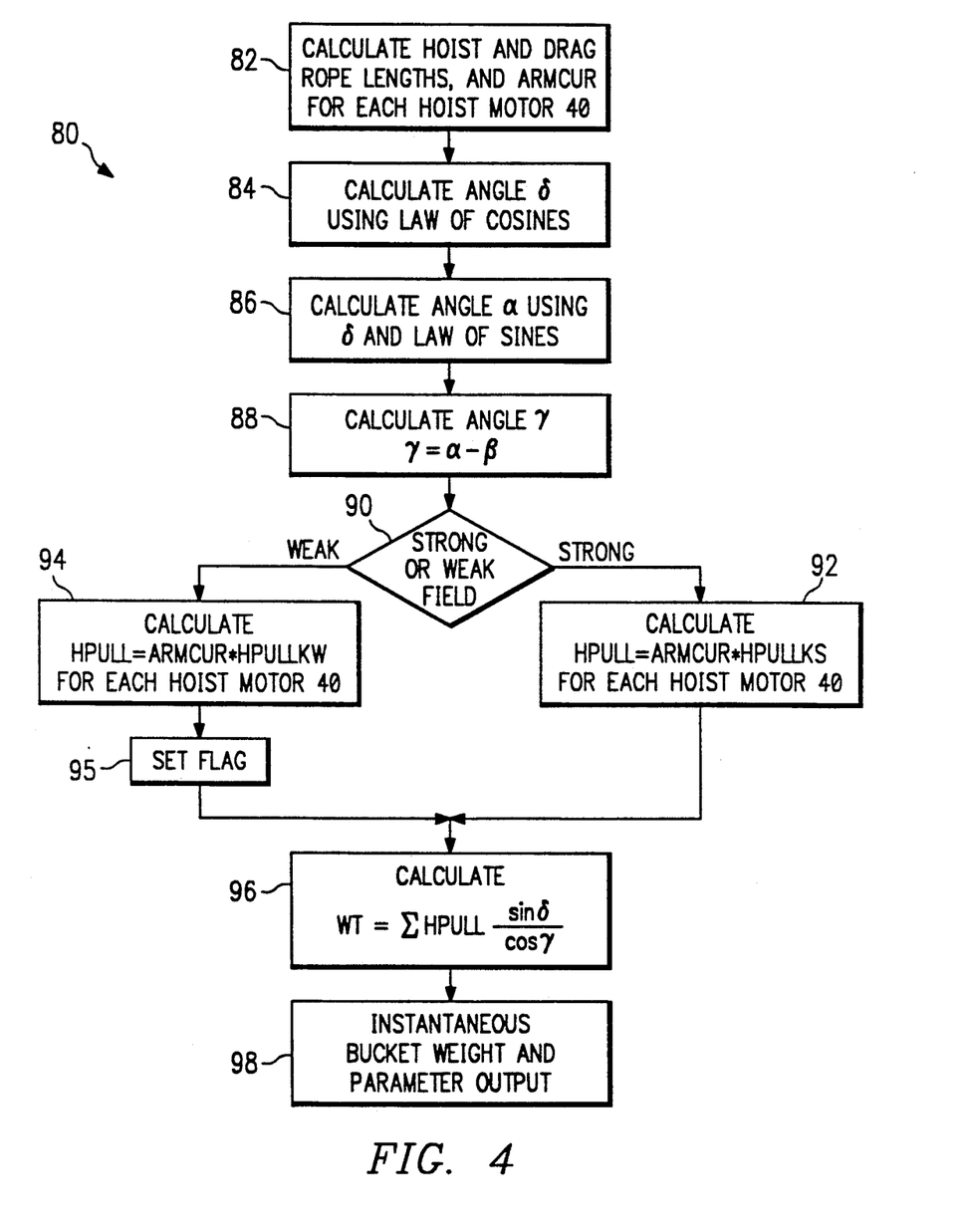
FIG. 4 is a flow diagram of the method of calculating dragline bucket weight according to the preferred embodiment of the invention.

Referring now to FIGS. 4 and 5, process 80 for calculating the bucket weight according to this preferred embodiment of the invention will be described in further detail. As will be apparent from the description hereinbelow, a conventional microprocessor-based workstation may be readily programmed to perform these calculations, using either a custom computer program designed for these calculations, or using a commercially available spreadsheet program such as 1-2-3® sold by Lotus, with the calculations set in the spreadsheet as appropriate. Process 80 begins with the calculation of the measured lengths of hoist rope 20 and drag rope 30, using the calibration values previously calculated in process 74. For drag rope 30, where the value sensed and communicated by drag rope length sensor 48 is represented by the value DLEN2, the length DLENGTH is calculated as follows:

$$DLENGTH = (DLEN2 - CNL2)*MUF2 + CAX2$$

The value DLENGTH corresponds to the length of drag rope 30 between bucket 18 and lower fairlead sheave 35, as shown in the geometry of FIG. 5. Similarly, for hoist rope 20, where the value sensed by hoist rope length sensor 48 is represented by the value HLEN1, the length HLENGTH is calculated as follows:

$$HLENGTH = (HLEN1 - CNL1)*MUF1 + CAX1$$

The value HLENGTH corresponds to the distance between sheave 26 and bucket 18, as shown in the geometry of FIG. 5.

Also in process 82, the armature current through each hoist motor 40 is sensed by each armature current sensor 54 (an individual value represented hereinbelow by the value HARM4). An adjusted armature current value ARMCUR is then calculated for each hoist motor 40 according to the calibration constants determined in process 74, as follows:

$$ARMCUR = (HARM4 - CNL4)*MUF4$$

This value ARMCUR is thus the actual, calibrated, value of armature current through one of hoist motors 40, and can be used to derive the force exerted by that hoist motor 40 in suspending bucket 18, using the motor constants previously determined or calculated.

Referring to the geometry of FIG. 5, the calculation of the values HLENGTH and DLENGTH, with the value ABLEN previously determined, allows for calculation of the angle $\delta$, in process 84, using the law of cosines, as follows:

$$\delta = \cos^{-1}[(HLENGTH^2 + DLENGTH^2 - ABLEN^2)/(2*HLENGTH*DLENGTH)]$$

The angle $\delta$ corresponds to the angle between hoist rope 20 and drag rope 30, at the location of bucket 18, as shown in the schematic diagram of dragline 10 in FIG. 5.

Upon calculation of the angle $\delta$, since the values HLENGTH and ABLEN are known, the angle $\alpha$ may be calculated, in process 84, using the law of sines, as follows:

$$\alpha = \sin^{-1}[(HLENGTH*\sin\delta)/ABLEN]$$

The angle $\alpha$ corresponds to the angle between the drag rope 30 of dragline 10 and the line segment ABLEN, as illustrated in FIG. 1. In process 86, the angle $\gamma$, which is the angle between drag rope 30 and the horizontal, is calculated by subtracting angle $\beta$ from angle $\alpha$.

As is evident from FIG. 5, upon completion of processes 82, 84, 86 and 88, the values of the particular geometric parameters necessary to calculate the weight of bucket 18 have been calculated, with the force applied by hoist motors 40 to maintain steady-state suspension of the weight of bucket 18 yet to be calculated. As is well known for conventional 824-type motors, the force may be calculated, knowing the torque parameters defined and calculated hereinabove, if the armature current is known. However, as is common for these motors, the torque exerted is not only a function of armature current, but is also a function of the field current. According to this embodiment of the invention, two field current ranges are defined, for each of which a torque function value (HTSTRG and HTWEAK) and a pull constant value (HPULLKS and HPULLKW) is determined and stored, for each hoist motor 40, in process 74.

It has been found that improvement in the efficiency of the dragline operation can be achieved by operating all of the hoist motors in their strong field current regime during the lifting (and accelerating) of bucket 18, and during such time as bucket 18 is maintained at its height in steady-state operation, and in its motion toward the dump site, shifting the operation of all hoist motors 40 into their weak field current regime when the motor speed exceeds 85-90% of the rated value (at which time the armature current must be increased to maintain the same force). It has been observed that such operation of hoist motors 40 results in the efficient operation. However, since the torque function value for a motor varies as a function of the field current, the calculation of the force applied by a hoist motor 40 must take such shifting into account, if it occurs during the sampling period of time.

Decision block 90 thus examines the sensed field current HFLD3 for one hoist motor 40 which, as noted hereinabove, will be representative of the field current for each of the hoist motors 40, after adjustment by its calibration constants, as follows:

$$HFLDCUR = (HFLD3 - CNL3)*MUF3$$

where the value HFLDCUR is the field current for the monitored hoist motor 40. In decision 90, the field current value HFLDCUR is compared to a threshold value to determine if hoist motors 40 are operating in the weak field or strong field condition.

Where hoist motors 40 are operating in the strong field condition, the force exerted by each of hoist motors 40 on bucket 18 is calculated in process 92, using the strong field pull constant HPULLKS and the armature current. The armature current HARM4 sensed by sensor 54 is adjusted by its calibration constants as follows:

$$ARMCUR = (HARM4 - CNL4)*MUF4$$

where the value ARMCUR is the armature current suitable for calculation of the hoist motor force, for one of hoist motors 40. Using the value ARMCUR, the force exerted a given hoist motor 40 is then calculated as follows, in process 92:

$$HPULL = ARMCUR*HPULLKS$$

where the value HPULL is the force exerted by the hoist motor 40.

If the field current value HFLDCUR indicates that hoist motors 40 are operating in the weak field regime, process 94 is performed to calculate the force HPULL exerted by each hoist motor 40. The value ARMCUR is calculated as described hereinabove, and the force HPULL in the weak field condition is calculated using the weak field pull constant HPULLKW:

$$HPULL = ARMCUR*HPULLKW$$

It should be noted that shifting of hoist motors 40 from the strong field current regime to the weak field current regime will present a discontinuity in the sampled sensed hoist motor parameters, and accordingly, possibly in the calculated bucket weight value. The engineer or operator may thus wish to discard bucket weight calculations in which the sampling period includes shifting of hoist motors 40 from the strong field regime to the weak field regime. In order that this may occur, process 95 thus sets a flag, or other indication to the engineer or operator, if operation of a hoist motor 40 in its weak field regime is detected. This allows the engineer or operator to discard this set of data, as will be shown hereinbelow.

Alternatively, it should be noted that a continuous function could be used, and evaluated, to determine the pull constant as a continuous function of the field current, rather than using discrete values as described hereinabove.

Process 92, or process 94, as the case may be, is repeated for each of hoist motors 40 in dragline 10, so that the force HPULL applied by each hoist motor 40 is calculated for whatever regime in which hoist motors 40 are operating. Using both the necessary geometry information of FIG. 5, and the force exerted by hoist motors 40, the weight of bucket 18 may now be calculated in process 96. Referring to FIG. 5, it can be seen that the weight of bucket 18 at this point in the dig operation can be determined by determining the vertical component of the sum of the forces exerted by hoist motors 40. Accordingly, the weight WT of bucket 18 at this state is calculated in process 96 as follows:

$$WT = \Sigma HPULL[\sin\delta/\cos\gamma]$$

Process 98 provides for the output of the calculated bucket weight WT instantaneously to the operator for the particular dig currently in process. Since the bucket weight WT is calculated for each set of sampled parameters in a given dig cycle, a set of calculated bucket weight values WT are calculated, each corresponding to a set of samples of the sensed parameters.

Upon completion of the sampling period and the calculations of process 80 for each of the samples, according to this embodiment of the invention, a measure of confidence in the calculated bucket weight is determined in process 100, for example by calculating a statistic indicative of the variation of the calculated bucket weight values WT for the set of sampled sensed parameters. Examples of such statistics include the range, variance, and standard deviation of the calculated bucket weights WT. For example, if the standard deviation of the calculated bucket weight values WT for the set of sampled parameters taken during the sampling period for a given dig cycle is relatively small, the engineer or operator can have a relatively high degree of confidence that no dynamic or transient discontinuities occurred during the steady-state portion of the dig cycle in which the sensed parameters were sampled (i.e., the sample period), and accordingly can have a relatively high degree of confidence that the average of the calculated bucket weight values WT is close to the actual weight of bucket 18, as filled for the particular dig cycle. Conversely, a relatively high standard deviation of the calculated bucket weight values WT for a sample set indicates relatively low confidence in the accuracy of the average of the calculated bucket weight values, indicating that dynamic conditions (e.g., bouncing, rocking, loss of material, shifting of motors into weak field current regime) may have been present during the sampling period.

Using information such as the standard deviation of the calculated bucket weight values WT for the dig cycle, and as gained by visual observation of the process, the engineer or operator has the necessary information to make a reasoned decision (in process 100) regarding the average of the calculated bucket weight values WT, and the raw data upon which it is based, for the dig cycle. Based upon the standard deviation of the calculated bucket weight values WT, upon the state of the flags set in process 95 to indicate shifting of hoist motors 40 into the weak field current regime, and upon visual observation of the excavation, the engineer or operator can accept the data as valid (storing the data and the result in the memory of computer system 60, as indicated by process 102), or reject the data as tainted or invalid (discarding the data and result by not storing the same in computer system 60, as indicated by process 103).

In either case, according to this embodiment of the invention, decision 104 is performed to determine if the bucket weighing session is complete. For example, the bucket weighing session may continue until valid data is measured in sampling periods for each of on the order of one hundred dig cycles. Such a bucket weighing session may thus require on the order of two hours to complete. If the bucket weighing session is complete, the process according to this embodiment of the invention ends, at which time output of a summary of the bucket weighing calculations for those dig cycles during which sample periods occurred, and for which the data was retained, may be generated.

If sample data and a calculated bucket weight from one or more additional dig cycles is required, the bucket weighing session continues. Prior to initiation of the next dig cycle, the engineer and operator may review the results of the bucket weighing method described hereinabove, including the motor and rope parameters sensed and calculated, and optimize the operating conditions of dragline 10 (decision 105 and process 106) prior to commencing the next dig cycle with process 76. It should be noted that control or alarm limits may be set for various parameters which are calculated in order to determine the weight of bucket 18, such various parameters having importance in the monitoring and control of the dragline dig operation. For example, control and alarm limits may be set for the values of the hoist and drag rope lengths, the hoist motor RPM, and the like, so that the operator may be made aware of abnormal operation of dragline 10 as evidenced by such parameters. It is also preferable that the engineer observe the end of the dig cycle to ensure that bucket 18 does not retain material, which would tend to defeat the intent of the bucket weighing session, which is to ultimately weigh the bucket with different material in each dig cycle.

Since the method described hereinabove determines the weight of the bucket 18, process 106 may involve such optimization as required to improve the accuracy of the bucket weighing calculations. For example, if the operator is observed to have introduced excessive dynamics during the sample period, the test engineer can correct this by instructing the operator to improve the excavation technique.

It is contemplated that other optimization techniques of the excavation operation, utilizing the benefits of the bucket weighing method and system described hereinabove, will now be apparent to those of ordinary skill in the art having reference to this specification and the drawings. For example, if the bucket weight determined by this method indicates that the design limitations of the bucket are being exceeded (for example, if the earth being removed has increased in density from dig to dig), the operator may change out bucket 18 to a smaller volume bucket, or to a higher strength (and weight) bucket so that the potential for a breakdown of dragline 10 is reduced. A significantly lower bucket weight than the design limitation may indicate that a larger capacity bucket should be used to increase the efficiency of the operation (i.e., fewer dig cycles required to complete the excavation).

In addition, other alternative techniques for gathering the information necessary for the computation of the bucket weight may also be used according to this invention. For example, the force on the hoist rope may be sensed by techniques other than calculation of the torque of the hoist motors; examples of direct methods for sensing the hoist rope force include in-line mechanical, electrical, or electromechanical load measuring devices connected, for example, within the hoist rope.

It should be noted that the use of the average bucket weight over a number of samples provides some degree of filtering of transient and dynamic effects of the dragline operation on the calculation of the bucket weight. Particularly where the standard deviation of the sampled and calculated weights is large, such filtering serves to further improve the accuracy of the real-time calculation of the suspended bucket weight according to this method, as compared to prior methods.

Further in the alternative, filtering techniques may be used relative to the sensed information, so that instantaneous dynamic effects and transients in the dig operation do not unduly affect the determination of the bucket weight. For example, the sensed parameters may be taken with a number of samples, with either the arithmetic mean, or the resultant data after application of a filter, used in the calculation. In addition, a mechanical or electrical filter may be applied to the sensor itself, so that the output signal communicated to the computer equipment has transient effects filtered therefrom. The techniques of pattern recognition, or position banding, may also be used in order to select accurate data for, and to reject spurious data from, application to the method according to this invention.

While the invention has been described herein relative to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of measuring the weight of a load comprising a container, comprising the steps of:
    commencing a dig cycle by digging a material into said container such that said load further comprises said material;
    suspending the load with a hoist after said step of commencing a dig cycle;
    observing the suspended load after said step of commencing a dig cycle;
    upon observing that the suspended load is in substantially a steady state during said dig cycle, sensing the force exerted by said hoist;
    calculating the weight of the suspended load using the sensed force exerted by said hoist; and
    concluding said dig cycle by dumping said material from said container.

2. The method of claim 1, wherein said sensing step comprises:
    sampling, a plurality of times, the value of the force exerted by said hoist.

3. The method of claim 2, wherein said calculating step comprises:
    calculating the weight of the suspended load a plurality of times, each corresponding to one of said sampled values of the force exerted by said hoist.

4. The method of claim 3, further comprising:
    calculating the average of the plurality of calculated weights of the suspended load.

5. The method of claim 3, further comprising:
    calculating the standard deviation of the plurality of calculated weights of the suspended load.

6. The method of claim 1, wherein said load is suspended by a dragline, said dragline comprising a hoist rope to which the force of said hoist is applied, and a drag rope to which force from a drag motor is applied, and further comprising:
    sensing the length of said hoist rope;
    sensing the length of said drag rope; and
    calculating the angle at which the load is suspended;
    and wherein said step of calculating the weight comprises:
    calculating the weight of the suspended load using the sensed force exerted by said hoist and said angle at which the load is suspended.

7. The method of claim 6, wherein said steps of sensing the length of the hoist rope and sensing the length of said drag rope are performed upon observing that the suspended load is in substantially a steady state.

8. The method of claim 6, wherein said sensing step comprises:
sampling, a plurality of times, the value of the force exerted by said hoist;
and wherein said step of calculating the weight comprises:
calculating the weight of the suspended load a plurality of times, each corresponding to one of said sampled values of the force exerted by said hoist.

9. The method of claim 8, further comprising:
after said step of calculating the weight, dropping said load;
suspending a second load; and
repeating said sensing and calculating steps for said second suspended load.

10. The method of claim 1, wherein said sensing step comprises:
measuring the armature current drawn by said hoist; and
calculating the force of said hoist using said measured armature current.

11. The method of claim 10, further comprising:
prior to suspending said load, measuring the efficiency of said hoist.

12. The method of claim 11, wherein said step of measuring the efficiency of said hoist comprises:
raising a test load;
measuring said armature current drawn by said hoist during said raising step;
lowering said test load; and
measuring said armature current drawn by said hoist during said lowering step;
and wherein said step of calculating the force of said hoist also uses said measured efficiency of said hoist.

13. The method of claim 1, wherein said hoist comprises a plurality of hoist motors, each coupled to a hoist drum;
and wherein said sensing step comprises:
measuring the armature current drawn by each of said hoist motors;
calculating the force applied by each of said hoist motors, using each of said sensed armature currents.

14. A method of measuring the weight of a load suspended by a hoist, said hoist comprising a plurality of hoist motors, and a hoist rope to which a force is applied by said hoist motors, comprising the steps of:
measuring the efficiency of said hoist;
measuring the armature current drawn by each of said hoist motors when suspending said load;
calculating the force applied by each of said hoist motors to said load by using said measured armature current and said measured efficiency; and
calculating the weight of said load using the sum of the forces applied by said hoist motors.

15. The method of claim 14, wherein said step of measuring the efficiency of said hoist comprises:
raising a test load;
measuring said armature current drawn by said hoist during said raising step;
lowering said test load; and
measuring said armature current drawn by said hoist during said lowering step.

16. The method of claim 14, wherein said load is suspended by a dragline, said dragline comprising a hoist rope to which the force of said hoist is applied, and a drag rope to which force from a drag motor is applied, and further comprising:
sensing the length of said hoist rope;
sensing the length of said drag rope; and
calculating the angle at which the load is suspended;
and wherein said step of calculating the weight comprises:
calculating the weight of the suspended load using the sensed force exerted by said hoist and said angle at which the load is suspended.

17. The method of claim 14, wherein said step of measuring the armature current comprises sampling, a plurality of times, the armature current drawn by said hoist;
and wherein said calculating steps calculate the force applied by said hoist and the weight a plurality of times, each corresponding to one of said sampled armature currents.

18. The method of claim 17, further comprising:
calculating the average of the plurality of calculated weights of the suspended load.

19. The method of claim 17, further comprising:
calculating the standard deviation of the plurality of calculated weights of the suspended load.

* * * * *

UNITED STATES PATENT AND TRADEMARK OFFICE
CERTIFICATE OF CORRECTION

PATENT NO. : 5,321,637
DATED : June 14, 1994
INVENTOR(S) : Robert C. Anderson, Don C. Splitstone, Mark R. Bentley It is certified that error appears in the above-indentified patent and that said Letters Patent is hereby corrected as shown below:

Column 11, line 64   Delete "6"; insert -- $\delta$ --.

Signed and Sealed this

Twenty-second Day of November, 1994

Attest:

BRUCE LEHMAN

Attesting Officer    Commissioner of Patents and Trademarks